(12) United States Patent
Cember et al.

(10) Patent No.: US 12,411,826 B2
(45) Date of Patent: Sep. 9, 2025

(54) LOCATION-CONSTRAINED STORAGE AND ANALYSIS OF LARGE DATA SETS

(71) Applicant: Amazon Technologies, Inc., Seattle, WA (US)

(72) Inventors: Matt A Cember, Grosse Pointe Park, MI (US); Emma Lippman, Harrison Township, MI (US); Vinaykumar S. Patil, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 17/934,562

(22) Filed: Sep. 22, 2022

(65) Prior Publication Data

US 2024/0104074 A1    Mar. 28, 2024

(51) Int. Cl.
*G06F 16/00* (2019.01)
*G06F 16/22* (2019.01)
*G06F 16/27* (2019.01)
*G06F 16/909* (2019.01)

(52) U.S. Cl.
CPC .......... *G06F 16/2219* (2019.01); *G06F 16/27* (2019.01); *G06F 16/909* (2019.01)

(58) Field of Classification Search
CPC .. G06F 16/27; G06F 11/2066; G06F 11/3006; G06F 16/909; G06F 16/9537; G06F 16/2219; G06F 11/3034; G06F 21/64; G06F 9/54; G06F 21/602; G06F 16/24575; H04L 67/1001; H04L 67/1008; H04L 67/1097; H04L 63/123; H04L 9/0643; H04L 9/3239; H04L 63/126; H04L 9/0894; H04L 9/0631; H04L 63/0428; H04L 63/0435; G06Q 30/00; G06Q 30/018; G06Q 10/0635; G06Q 30/0256; G06Q 30/0244; G06Q 30/0243; G06Q 30/02; G06Q 30/0248; G06Q 50/265

See application file for complete search history.

(56) References Cited

U.S. PATENT DOCUMENTS

| | | | |
|---|---|---|---|
| 10,567,234 B1 * | 2/2020 | Todd | H04L 43/106 |
| 10,579,436 B2 | 3/2020 | Jain et al. | |
| 10,812,455 B1 | 10/2020 | Reissner et al. | |
| 10,839,099 B2 | 11/2020 | Vogel et al. | |
| 11,087,225 B2 | 8/2021 | Nickl et al. | |
| 11,151,269 B2 | 10/2021 | Mathur | |
| 2001/0034795 A1 * | 10/2001 | Moulton | H04L 67/1001 709/225 |
| 2007/0203718 A1 * | 8/2007 | Merrifield | G06Q 30/00 705/317 |

(Continued)

OTHER PUBLICATIONS

International Search Report and Written Opinion mailed Jan. 9, 2024 in PCT/US2023/074231, Amazon Technologies, Inc., pp. 1-12.

*Primary Examiner* — Yicun Wu
(74) *Attorney, Agent, or Firm* — Robert C. Kowert; Kowert, Hood, Munyon, Rankin & Goetzel, P.C.

(57) ABSTRACT

A constraint on a location at which a portion of a data set can be stored is determined based on input received via a programmatic interface. The portion of the data set is stored at a location selected in accordance with the constraint. An analysis operation, whose input includes the portion of the data set, is performed at a set of computing resources selected from a plurality of resources based at least in part on their location.

20 Claims, 11 Drawing Sheets

(56) References Cited

U.S. PATENT DOCUMENTS

| | | | |
|---|---|---|---|
| 2010/0241507 A1* | 9/2010 | Quinn | G06Q 30/0256 705/14.42 |
| 2017/0141921 A1* | 5/2017 | Berger | H04L 63/123 |
| 2020/0342119 A1* | 10/2020 | Yared | H04L 9/0643 |
| 2021/0097041 A1 | 4/2021 | Patel et al. | |
| 2021/0248247 A1 | 8/2021 | Poothokaran et al. | |
| 2021/0397735 A1 | 12/2021 | Samatov et al. | |

* cited by examiner

Location-impacted response generation policies 802 for analytics job requests

UseAggregatedVersionOfInaccessibleData 815

UseSubstitutedVersionOfInaccessibleData 820

SplitJobIntoSubJobsAndCombineResults 825

FailAndProvideLocationRelatedErrorMessage 830

IgnoreInaccessibleData 835

LOCATION-CONSTRAINED STORAGE AND ANALYSIS OF LARGE DATA SETS

BACKGROUND

The data and employees of large organizations can be spread over many geographical regions or countries. Large amounts of business data generated in the different regions, often in different formats, may be combined in storage repositories (such as data lakes) for analysis required to make important business decisions. In recent years, data privacy and security considerations have led to user concerns about the locations at which data can be stored and processed. Ensuring that the location constraints of users are enforced while still enabling efficient and accurate analysis of large volumes of data can present a non-trivial technical challenge.

BRIEF DESCRIPTION OF DRAWINGS

FIG. 8 illustrates example policies which may be implemented at a data storage and analytics service to handle analysis requests whose results may be impacted by location constraints, according to at least some embodiments.

Figure 1:
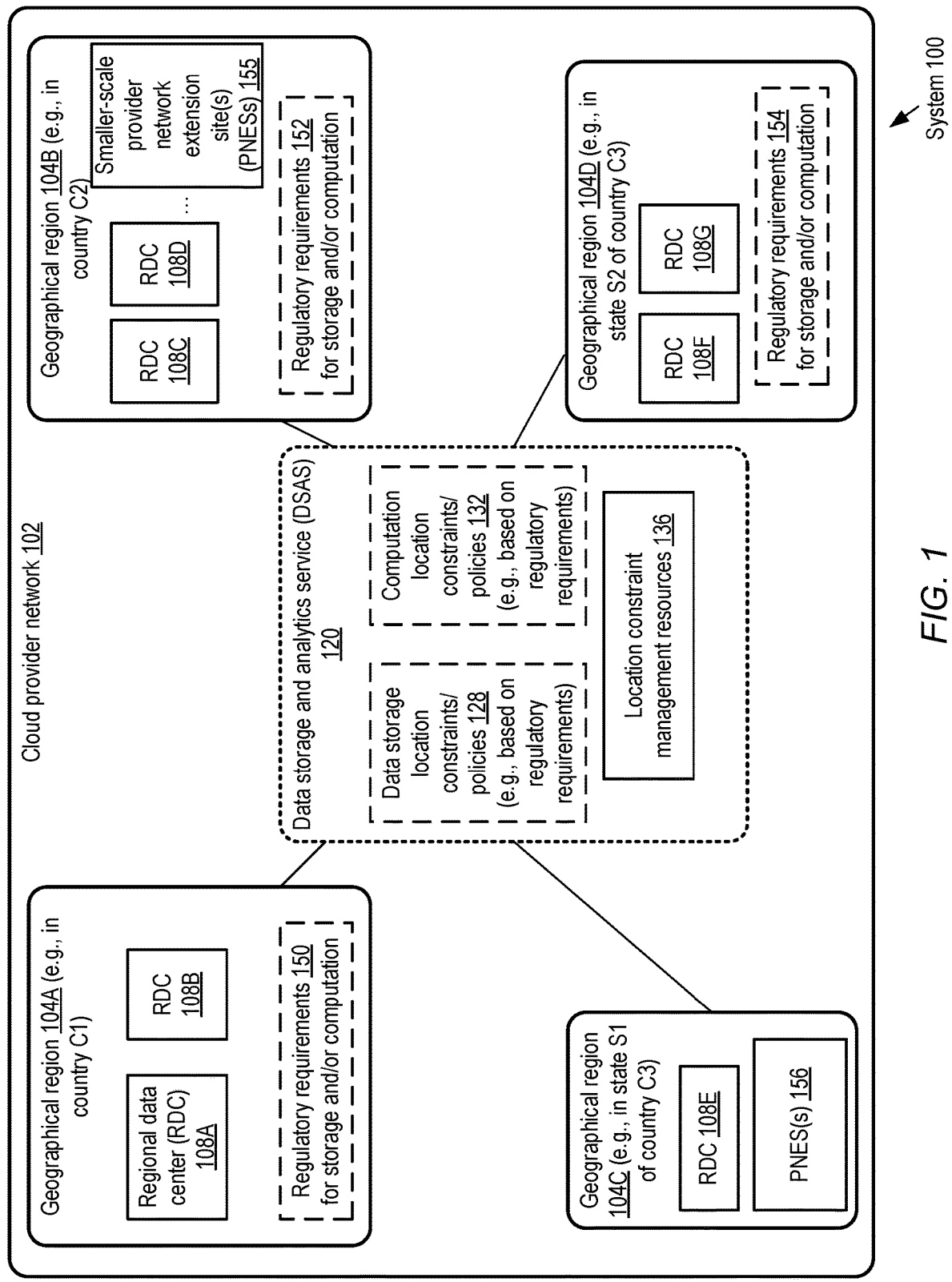
FIG. 1 illustrates an example system environment in which location constraints pertaining to data storage and computations may be enforced at a data storage and analytics service implemented at a cloud provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for efficiently supporting location constraints on the storage of large data sets and on the computations performed to analyze the large data sets. For a variety of reasons such as concerns about data privacy and security, authorities in several jurisdictions around the world have created (or are in the process of creating) regulations that govern where certain kinds of data can be stored, where machines that are used to perform analysis tasks on those kinds of data can be located, and locations from which requests to perform the analysis tasks are permissible. For example, a law passed in one country may require that records of business activities (such as sales of items from a web site or a physical store) must be retained within the country, or that personal information about citizens or residents of that country must be retained within the country.

Large organizations that operate in multiple geographical regions, such as multinational corporations with employees and customers in many different jurisdictions, may need to collect, store and analyze business data from all the regions to make some types of important business decisions. In the absence of regulations on location constraints, data sets from various regions could be combined into a single storage repository such as a data lake at any premise anywhere in the world, and analyzed using machines located at any premise. The concept of location constraints has not been built in, at least as a prominent concern or attribute, in the design and architecture of many traditional storage and analytics systems. The passage of regulations on location constraints means that at least for some data sets and for some computations, location-agnostic or location-unaware operations may no longer be acceptable.

In order to enable support for compliance with or enforcement of location constraints, a data storage and analytics system or service can provide a variety of tools, interfaces and mechanisms in various embodiments. Such a service may be implemented at a cloud computing environment whose resources are distributed across data centers and other types of premises in multiple geographical locations in some embodiments. For example, such a data storage and analytics service (DSAS) may implement programmatic interfaces that can be used by data set owners or creators to specify the constraints (if any) on where their data sets (or specific portions of the data sets) should be stored, and/or where computations on the data sets should be performed. The DSAS may select, for such storage-location-constrained data, persistent storage devices at specific premises identified in accordance with the location constraints. Metadata indicating the applicable location constraints and/or the specific locations at which at least a primary copy of various portions of the data set are stored, e.g., at a catalog maintained at the DSAS in various embodiments. In some cases data set owners, data producers and/or data consumers may be able to query or browse such catalogs directly; in other cases, the catalog may not be directly accessible, but application programming interfaces (APIs) for accessing the data may reveal that such catalogs are being used behind the scenes. When a data consumer or analyst wishes to examine stored data, the DSAS may first ensure that the applicable location constraints allow the data consumer to examine the data (for example, requests to analyze data collected in country A may only be acceptable if the requests are issued from within country A). Then, if the request is permitted, the DSAS may determine constraints (if any) on locations at which computations of the kind of analysis operations being requested can be performed, and choose computational resources accordingly.

Depending on the nature of the analysis which is to be performed, in various embodiments some portions of a data set may be proactively replicated to a computation location from their original locations before the computations are performed (as long as the replication is permitted under the applicable location constraints). Only the subset of the data set that is essential for the computations may be replicated in such embodiments, thereby minimizing network bandwidth consumption and time taken to replicate. According to some embodiments, constraints on where computations should be performed on a given set of data may be stored in the DSAS catalog. In some cases the data consumer may provide an indication of the constraints on computation resource locations; in other cases, the data set owner or creator may already have indicated the constraints. In one embodiment, a data consumer may provide preferences (e.g., based on cost optimization considerations) regarding the locations at which a set of computations should be performed, and such preferences may be used (as long as they are compliant with applicable location constraints) to select specific computing resources that are used for the set of computations. In some embodiments, as indicated above, location constraints on computations may apply not only to the machines on which the computations may be run, but also to the locations of the data consumers (or the machines from which the requests for analyzing the data are received), and such constraints may also be enforced by the DSAS. Location-related audit records of various kinds may be generated, stored, and provided via programmatic interfaces by the DSAS, such as records indicating where data was physically stored, where machines used for analyzing the data were performed, and so on.

In some embodiments, given a particular location constraint pertaining to storage or analysis of a portion of a data set, the DSAS may provide recommendations for premises at which the data set portion can be stored or analyzed to satisfy the location constraint; as such, the data set owner or consumer may not need to be aware of all the locations at which resources can be utilized by the DSAS. Location constraints on data storage and computations may also be referred to as residency requirements.

As one skilled in the art will appreciate in light of this disclosure, certain embodiments may be capable of achieving various advantages, including some or all of the following: (a) ensuring auditable compliance with regulations that impose physical location requirements on data sets and computations, without imposing substantial overheads on data set owners or data set consumers, (b) reducing the amount of network bandwidth, physical storage and/or other resources needed to perform analysis on data sets which are covered by location-related regulations, e.g., by minimizing the amount of data that is replicated for various types of analysis tasks, compacting the data in a location-aware manner, and/or (c) simplifying the workload of data set administrators and data stewards responsible for ensuring that location-related policies are enforced, e.g., by providing recommendations on where data should be stored and analyzed in view of applicable location constraints. From the perspective of at least some data consumers, implementation of the techniques introduced herein may enable analysis operations on large data sets to be performed in a backwards-compatible manner (e.g., using the same conceptual model for accessing the data which was used prior to the introduction of location constraints) regardless of whether location-related regulations are in effect on their data, or not. Despite storing different portions of a dataset in different persistent storage locations, analysis and usage of the data for business operations can remain at parity with the analysis and usage that was being performed before location constraints were supported in the described manner. Some customers of a data storage and analysis service may use the service's location constraint management features for various data sets and/or computations even if location-related regulations do not apply to the data sets or computations.

According to some embodiments, a system may include one or more computing devices. The one or more computing devices may include instructions that upon execution on or across the one or more computing devices determine, based at least in part on input received via one or more programmatic interfaces of a cloud computing environment whose resources are distributed among a plurality of data centers in respective geographical regions, a first constraint on a location at which a first portion of a data set can be stored. The first constraint may be compliant with a legal requirement applicable to the first portion of the data set. The data set may be intended to be consumed as input by one or more analysis operations performed using computing resources of the cloud computing environment in various embodiments. In some embodiments, the data set may comprise a collection of records, with each record including a partition key, and the partition keys may be used as signifiers or indicators of location constraints. For example, in one embodiment, a mapping between partition keys and applicable location constraints may be maintained as part of the metadata stored at a DSAS. As such, the legal requirement may be applicable to a partition identified by a particular partition key in such embodiments.

The first portion of the data set may be stored at a first set of persistent storage devices selected in accordance with the first constraint in various embodiments. The first set of persistent storage devices may be located, for example, at a first data center of the plurality of data centers of the cloud computing environment. Location metadata pertaining to the portions of the data set may be stored, e.g., at a catalog maintained at the cloud computing environment in various embodiments. Not all the portions of the data set may be governed by location constraints in some cases. For example, the location metadata may indicate that a second portion of the data set (to which the location constraint does not apply) is stored at a second set of persistent storage devices at a second data center of the plurality of data centers.

A second constraint on a location at which computations of an analysis operation can be performed on the first portion of the data set may be determined in various embodiments, e.g., also based on input received via the programmatic interfaces. In some cases, the constraints on storage as well as computations may be identical (e.g., a portion of the data set which was stored within a particular country may also have to be analyzed using machines located in the particular country). In other cases, different constraints may apply to the storage than to the computation. The analysis operation may be performed using at least the first portion (to which the second constraint applies) of the data set and the second portion (to which the second constraint does not apply) of the data set as input. A set of computing resources of the cloud computing environment may be selected, based at least in part on the second constraint, for performing the computations in various embodiments. The results of the computations may be provided to a data consumer or analyst. In various embodiments, audit records of various kinds pertaining to the data set and its location constraints may be provided via the programmatic interfaces of the cloud computing environment—e.g., an audit record indicating where the first portion of the data set was stored may be provided, another audit record indicating where the computations were performed may be provided, and so on.

In at least some embodiments, the storage location constraints associated with a data set may be received at a DSAS via programmatic interfaces from the creator/owner of the data set, e.g., the entity at whose request the data set is stored or written initially within the DSAS. Data set owners or creators may also be referred to as data producers. Note that in some embodiments, while a data set may have a single owner, multiple contributors may add data to the data set or modify data within the data set. In one embodiment, a data consumer, on whose behalf the data set is analyzed, may use the DSAS's programmatic interfaces to specify constraints regarding the locations at which the analysis is to be performed. In some embodiments, the data set creator/owner may specify the computation location constraints as well as the storage location constraints; in some cases, as indicated above, the same location constraints may apply to both storage and computations for a given portion or all of a given data set. In one embodiment, an entity referred to as a data steward or a data security manager within an organization may be responsible for ensuring that applicable location-related regulations are complied with, and such a data steward may specify the location constraints for storage and/or computations involving various data sets. In some embodiments, the specific locations (e.g., cities, states, or data centers) at which a portion or all of a data set is to be stored may be indicated by the data set owner/creator via programmatic interfaces. In other embodiments, the data set owner/creator may instead provide an indication of, or a pointer to, the applicable laws and/or regulations, without initially specifying locations. The DSAS may examine the regulations and propose one or more locations or premises at which the data set can be stored in order to be compliant with the regulations; if the data set owner/creator approves the recommended location(s), the approved location(s) may then be used. Some cloud provider networks comprising DSASs may have numerous primary data centers as well as non-primary premises (which may in some cases be referred to as edge locations of the cloud), with new premises being added fairly frequently over time. This type of frequent expansion of the number of available premises may make it harder for DSAS clients or customers (such as the data set owners) to keep track of all the available premises, so the recommendations provided by the DSAS may be very helpful.

In some embodiments, portions of data sets may be replicated in order to enable computations to be performed in compliance with location constraints or regulations. For example, consider a scenario in which portion P1 of a data set DS1 has location constraints with respect to storage as well as analysis operations, while another portion P2 does not have such constraints. Each of the portions P1 and P2 may comprise numerous (e.g., millions) of records. Assume further that a primary or default copy of P1 is stored at a location L1 in compliance with the applicable constraints, while the primary or default copy of P2 is stored at a different location L2 (L2 may be a location close to where the records of P2 were generated). In response to an analysis request AR1 directed to DS1, a determination may be made as to whether all of P2 is needed for AR1, or whether a subset P2' of P2 is needed. The subset P2' may be replicated from L2 to L1 for AR1 in various embodiments, and retained there in a cache in case it is needed for additional requests. Furthermore, an incremental or change-record approach to location-aware replication may be implemented in some embodiments for analysis requests that are run periodically. For example, if AR1 is to be run every day with respect to the previous N days of data, each day, a replication manager of the DSAS may only transfer a copy of those records of P2 or P2' which have changed since the previous day to L1.

In some embodiments, multiple records of a given data set may refer to the same real-world object or event, and may thus provide opportunities for data consolidation or compaction prior to analysis. For example, consider a case where the records of a data set DS1 represent information about orders submitted to an e-retail web site. When a customer creates a new order, a record may be added to DS1 indicating a new order identifier OI1. If the customer later modifies the order, e.g., by adding or removing an item, and/or by changing the delivery method, additional records may be written to DS1, all associated with the original order OI1. In at least one embodiment, as part of responding to some types of analysis requests, related data set records (e.g., of a replicated version of a portion of a data set) may be logically compacted or combined into a final version of the record before the analysis is conducted. Such compaction may speed up the analysis substantively in cases very large data sets with numerous logically related records are being analyzed. The compaction may be performed in some embodiments at the locations at which the computations are performed, e.g., after the relevant data has been replicated, using the incremental approach, to the locations.

In some cases, location constraints of the kind introduced above may potentially impact the results of analytics operations. For example, consider a scenario in which a data set DS1 comprises 10 million records, with 2 million records constrained to be stored and analyzed in a particular geographical region R1, 3 million constrained to be stored and analyzed in another region R2, while the remaining 5 million records do not have applicable location constraints. If an analysis request which requires examining contents of all 10 million records is received, the location constraints would prevent a response which involved reading the entire data set in any single region from being generated. Even if the 5 million records were copied to region R2, the 2 million records of region R1 would not be available for analysis, for example. Analytics operations whose results are affected by location constraints may be referred to as location-impacted analysis operations, and the corresponding responses may be referred to as location-impacted responses. In at least some embodiments, the owners/creators of data sets managed at a DSAS, and/or the consumers of analytics operations directed to such data sets, may specify location-impacted response generation policies indicating the kinds of actions that are to be taken to prepare responses to the location-impacted analytics operations. For example, according to one such policy, the DSAS may try to use as much of the data set in original form as possible, while using aggregated or transformed versions of the remaining part of the data set when preparing the response. In the above example, 5 million records of the 10 million may be replicated to R2, and used in their original form along with the 3 million records stored in R2, while aggregated or transformed values for the remaining 2 million records may be used in accordance with such a policy. Note that it may not always be possible to use aggregated or transformed versions of portions of a data set while using the original version of other portions. Another policy may simply permit the DSAS to generate an error message indicating that the requested analytics operation cannot be performed. According to a third policy, some types of analytics jobs impacted by location constraints may be split up into smaller sub-jobs at different locations (e.g., respective sub-jobs analyzing the 5 million, 3 million and 2 million records in respective locations in the above scenario) which can be run without violating the constraints, and the results may be combined as long as combining the results does not violate the location constraints.

As mentioned above, a data storage and analytics service using the location-aware storage and analysis techniques introduced above may be implemented at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services. In some cases, storage servers and storage-related functionality may be managed at a storage service such as a data lake management service or various database services of the provider network, while analytics functionality may be managed at one or more separate computation-oriented services of the provider network.

FIG. 1 illustrates an example system environment in which location constraints pertaining to data storage and computations may be enforced at a data storage and analytics service implemented at a cloud provider network, according to at least some embodiments. As shown, system 100 includes artifacts and resources of data storage and analytics service (DSAS) 120 of a cloud provider network 102. The cloud provider network may comprise a plurality of large regional data centers (RDCs) distributed among numerous locations, as well as smaller-scale provider network extension sites (PNESs). For example, RDCs 108A and 108B may be located in geographical region 104A in a country C1, RDCs 108C and 108D may be located in geographical region 104B in country C2, RDC 108E may be located in geographical region 104C comprising a state S1 of country C3, and RDCs 108F and 108G may be located in geographical region 104D in a different state S2 of country C3. RDCs may each typically comprise hundreds or thousands of servers of various classes in some embodiments, and may be referred to as primary data centers of the provider network. In contrast, PNESs may comprise fewer (e.g., no more than a few dozen) servers in some embodiments, and may in general require a much smaller physical premise than the RDCs. Some PNESs may be referred to as edge locations or edge premises of the cloud provider network. In some embodiments, PNESs may support a more limited set of functionality than the RDCs—for example, control-plane or administrative components of a virtualized computing service whose compute resources may be used for analysis may reside only at the RDCs and not at the PNESs in one embodiment, so configuration requests from clients of provider network services may have to be directed to the RDCs. Not all geographical regions may necessarily comprise both RDCs and PNESs in some embodiments; for example, region 104B includes one or more PNESs 155 as well as RDCs, region 104C comprises an RDC and one or more PNESs 156, while regions 104A and 104D each include RDCs but do not include PNEs. In some embodiments, the resources of the provider network may be further organized into availability zones to reduce the impact of various types of large-scale failures or events such as extreme weather events, as described below in further detail, with each availability zone comprising at least a portion of one or more RDCs.

In the embodiment depicted in FIG. 1, the resources of the DSAS 120 may be spread across multiple RDCS and/or PNESs in the different regions, thereby enabling the DSAS to comply with various types of regulatory requirements pertaining to the storage and analysis of data sets managed by the DSAS. Different sets of laws or regulations may apply in respective regions within which the provider network operates. For example, a first set of regulatory requirements 150 for storage and/or computation may apply within region 104A at a given point in time, a second set of regulatory requirements 152 may apply within region 104B, while a third set of regulatory requirements 154 may apply within region 104D. The regulations may be applicable at various granularities in different embodiments—e.g., regulatory requirements 150 may apply to data generated at or pertaining to residents of all of C1, regulatory requirements 152 may apply to data generated at or pertaining to residents of all of C2, while regulatory requirements 154 may apply to data generated at or pertaining to residents of one state S2 of country C3 (and may not apply to other states such as S1). In addition, regulations pertaining to location constraints on data storage and computations may evolve over time—for example, more classes of data may be covered by an updated version of a law than were covered by an earlier version of the law. Note that not all regions may have applicable location-related regulations in some embodiments—e.g., some countries may have regulations while others do not, or some states within countries may have regulations while others do not.

In order to enable clients of the DSAS 120 to comply with evolving location-related regulations with respect to data sets managed with the help of the DSAS, various DSAS components collectively referred to as a location constraint management resources 136 may be implemented in the depicted embodiment. These resources may be responsible for tracking and enforcing data storage location constraints/policies 128 (which may in turn be based on regulatory requirements 150, 152 or 154) as well as computation location constraints/policies 132. The location constraint management resources may implement or enhance preexisting DSAS programmatic interfaces, such as web-based consoles, command-line tools, graphical user interfaces, and/or APIs to support location constraint awareness. Such programmatic interfaces may be used by DSAS clients to specify location constraints, obtain metrics on operations (such as replication of data) resulting from location constraints, and/or indicate various kinds of policies to be used to handle such constraints in different embodiments. The DSAS may maintain metadata describing various properties of managed data sets in some embodiments, and the metadata may be enhanced (e.g., by adding additional fields) to provide information about location constraints on various portions or partitions of the managed data sets in at least some embodiments. The location constraint management resources may in effect enable location constraints to be treated as a core property/requirement of data and computation at the DSAS in the depicted embodiment, and as such location constraints may be built in natively to most or all of the functionality provided throughout the DSAS.

Based at least in part on input received via the programmatic interfaces of the DSAS, a first constraint (e.g., based on an applicable set of regulations) on a location at which a first portion of a data set can be stored may be determined in the depicted embodiment. A set of persistent storage resources may be selected for that portion of the data set based on the first constraint, e.g., at an RDC or a PNES, and location metadata indicating the respective locations of various portions of the data set may be stored within a catalog maintained at the DSAS. Other portions of the same data set, to which the regulations applicable to the first portion do not apply, may be stored at other locations based on various considerations such as proximity to data sources or data generators. The location metadata may be accessible to at least some data set owners and/or data consumers, making it possible, for example, to obtain responses to location-related queries for various portions of the data set if desired.

A second constraint on a location at which computations of analysis operations can be performed on at least some portions of the data set may be determined at the DSAS in some cases; in other cases, the same location constraints may apply to both data storage and computation for the first portion of the data set. The computations may be performed using resources selected (e.g., at an RDC or a PNES) in accordance with such computation-related location constraints in various embodiments. In some embodiments, some portions of the data set, originally stored at one location, may be replicated proactively (e.g., using efficient techniques to minimize the amount of data transferred as discussed below) to another location to accommodate the computation-related constraints. Audit records indicating various location-related information for data sets maintained at the DSAS, such as the location at which various portions of the data set were stored, as well as the locations at which computations were performed, may be provided via programmatic interfaces of the DSAS in different embodiments.

Figure 2:
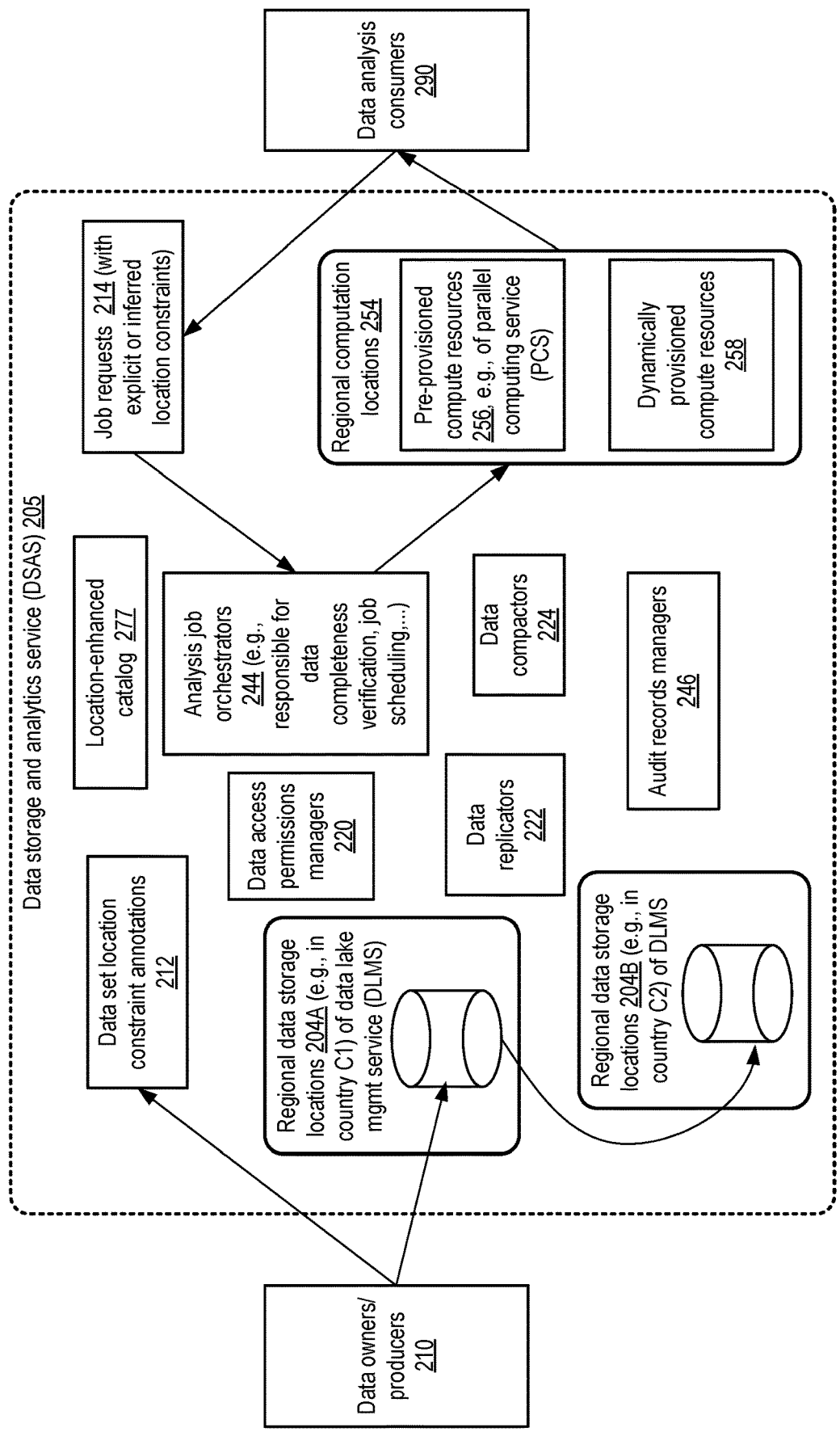
FIG. 2 illustrates example components of a data storage and analytics service which supports location-constrained data storage and analysis, according to at least some embodiments.

FIG. 2 illustrates example components of a data storage and analytics service which supports location-constrained data storage and analysis, according to at least some embodiments. At least some of the components of data storage and analytics service (DSAS) 205 of FIG. 2 may represent examples of location constraint management resources of the kind mentioned in the context of FIG. 1. Individual ones of the components shown in FIG. 2 may be implemented using a combination of software and hardware in various embodiments. A data storage subsystem of the DSAS 205 may comprise a data lake management service (DLMS). Data lakes are centralized and secured repositories that can be used to collect and store various types of data from a variety of data sources (such as relational or non-relational databases, object storage services, and the like), both in raw formats and in formats which have been processed for analysis. DLMSs enable clients to break down data silos and combine different types of analytics to gain insights and guide business decisions. The amount of data that is included within a data lake set up for an organization or client can grow quite large—e.g., terabytes or petabytes of data may be stored in a given instance or example of a data lake, and new data may be added frequently. In some cases, some or all of the data which is to be included or inserted into a data lake may be unstructured or semi-structured in its original form, and the DLMS may provide tools (such as data store crawlers) that can examine the data and automatically infer a schema (e.g., column names and data types for tables comprising multi-column rows or records) for the data.

Clients of the DSAS 205 may include data owners/producers 210 as well as data analysis consumers 290 in the depicted embodiment. In the embodiment depicted in FIG. 2, data owners or data producers may provide data set location constraint annotations 212 pertaining to various portions of the data which is to be stored on behalf of the owners/producers. The annotations may indicate, for example constraints on where the data can be stored, where computations of the data can be run, where data consumers can send computation requests from, and so on. At least some of the location constraint-related information pertaining to various data sets may be included in a location-enhanced catalog 277 in the depicted embodiment. In accordance with the constraints (if any) on storage location, different portions of the data may be stored in a variety of locations such as regional data storage locations 204A or 204B of a DLMS in the depicted embodiment. Regional data storage location 204A may for example comprise one or more data centers or provider network extension locations within country C1, while regional data storage locations 204B may comprise one or more data centers or provider network extension locations within a different country C2. For data to which storage location constraints do not apply, other considerations such as proximity to the sources from which data is being ingested into the DLMS (to minimize data transfer costs), overall storage load balancing, cost and the like may be used to select the regional data centers at which the data should be stored in some embodiments. Note that the techniques introduced herein may also enable workloads to be balanced along several dimensions (including storage use, network bandwidth use, computing resource use, etc.) in scenarios in which location constraints apply to data storage and computations.

In some cases, e.g., to facilitate the generation of response to certain types of computation requests (to which location constraints may apply) from data analysis consumers 290, one or more data replicators 222 may automatically cause portions of a data set to be transmitted or copied from their original or primary storage locations (e.g., locations 204A) to other storage locations (e.g., locations 204B) in advance of the computations. An incremental approach to replication may be implemented in some embodiments, in which as often as possible, only the changes to relevant records of the data set (or changes to subsets of records to which analysis requests are expected to be directed) are replicated rather than the entirety of the records.

In some embodiments, the DSAS may include one or more data compactors 224 responsible for consolidating logically related data records into single records prior to computation operations. Data compactors may be run at each of the locations at which a data set is analyzed in some embodiments—that is, compaction may be performed locally at the premises selected for replicating data set portions. An example of such a consolidation or compaction operation is provided below in the context of FIG. 5. Data access permissions managers 220 may be responsible in the depicted embodiment for ensuring that read or write requests, including job requests 214 for computations on various data sets, are accepted only if they are compliant with location constraints applicable to the sources from which such requests can be accepted. Audit records managers 246 may be responsible for ensuring that records pertaining to location information (such as where different portions of data sets are originally stored, where computations are performed on the portions of the data sets, and so on) are generated, stored (e.g., for a minimum time period indicated in applicable regulations pertaining to location constraints) and provided to data owners/producers and/or to regulatory authorities in the jurisdictions in which the DSAS operates in the depicted embodiment.

In at least some embodiments, job requests 214 for analytics computations on portions or all of various data sets may be submitted via DSAS programmatic interfaces by data analysis consumers. A given job request may indicate, for example, the targeted data set portions, details of (e.g., including algorithms to be used for) computations to be performed, whether the computations are to be run just once or repeated periodically as new data becomes available, and so on. In some cases, the requests may include location constraints specified by the consumers, indicating for example that only machines located within a particular country or state/province can be used for the computations based on applicable regulations. In other cases, computation resource location constraints may be inferred at the DSAS (e.g., by analysis job orchestrators 244), based on the targeted data, the locations from which the job requests are received, and so on.

Analysis job orchestrators 244 may be responsible for scheduling requested jobs at resources selected in accordance with applicable location constraints in the depicted embodiment. One or more regional computation locations 254 may be selected for a given job based on the location constraints by the orchestrators. Note that at least in some cases, the computations may be performed in the same locations in which the corresponding portion of the data set was stored—for example, for some jobs, a set of compute resources located at a regional data center RDC1 may be used to perform analysis on data stored at persistent storage devices also located in RDC1. In some cases, pre-provisioned compute resources 256 at the selected location may be employed for a given job, such as clusters of computationally powerful servers of a parallel computing service which have already been acquired by the DSAS for earlier computations. In other cases, the analysis job orchestrators 244 may use dynamically provisioned compute resources 258 for a given job, which may be released after the job completes. In various embodiments, data may have to be prepared or collected at a computation location before the computations on it can begin—e.g., data may have to be copied from a different location, or pre-processed in various ways. Analysis job orchestrators may be responsible for determining when data needed for a given job is "complete" or ready, and then cause the corresponding job to be initiated in the depicted embodiment. The term "data completeness verification" may refer to the task (part of the responsibility of analysis job orchestrators) of ensuring that all the needed data is available in the right format and at the right location, before starting an analytics job in the depicted embodiment.

Figure 3:
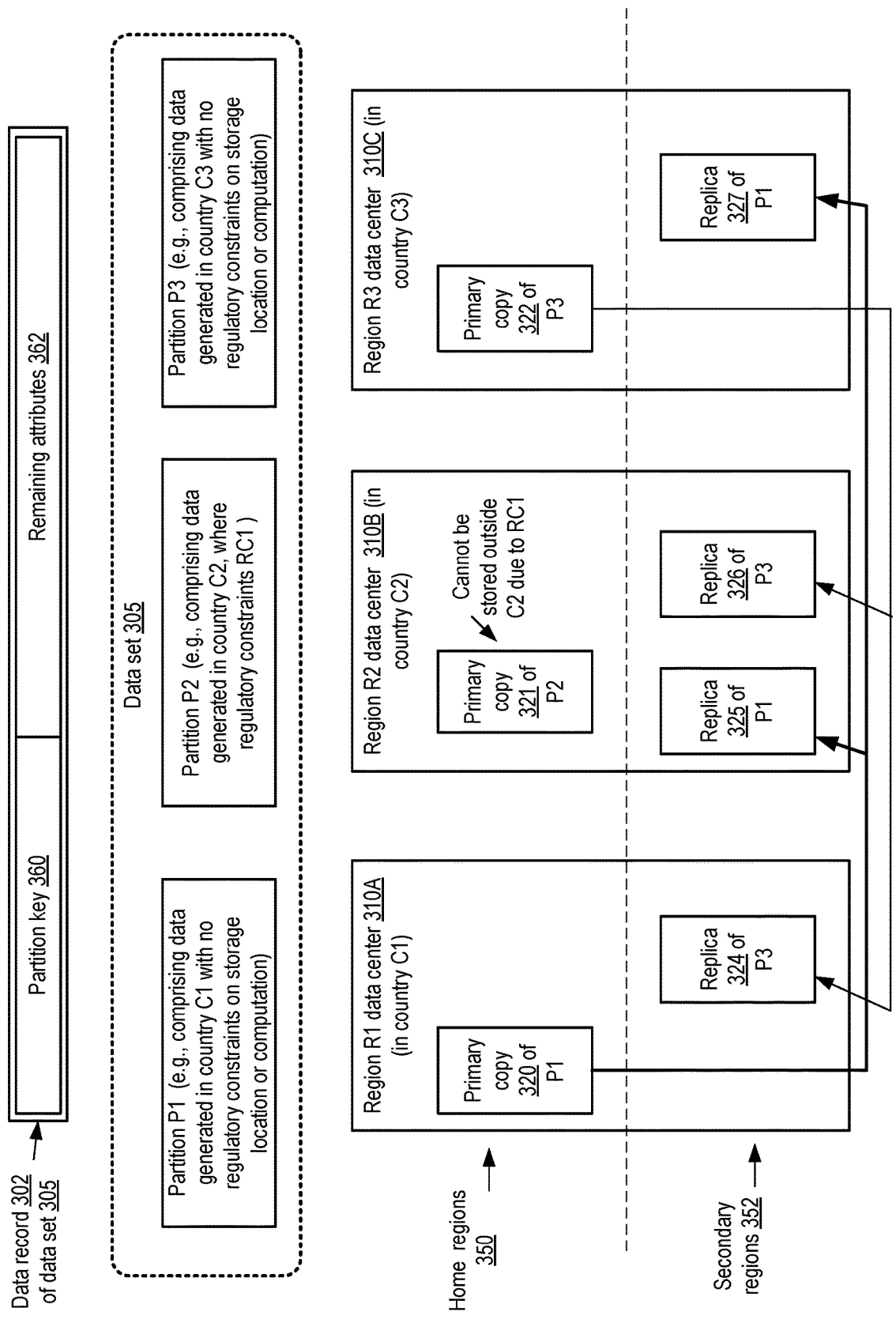
FIG. 3 illustrates a simple example of the use of partition-level replication of data sets to comply with location constraints, according to at least some embodiments.

FIG. 3 illustrates a simple example of the use of partition-level replication of data sets to comply with location constraints, according to at least some embodiments. In the embodiment depicted in FIG. 3, a data set stored at a DSAS similar in features and functionality to DSAS 120 of FIG. 1 may comprise a plurality of data records, with each data record comprising values of a plurality of attributes or fields. A subset of the attributes of a given data record 302 may be designated as a partition key 360 which can be used to subdivide the data set into partitions for location-based storage and analysis, while the remaining attributes 362 may comprise attributes which are not used for location-based partitioning. A mapping function (comprising for example one or more hash functions) may be applied to a partition key of a record to identify the partition to which the record belongs, and one or more partitions may be stored at respective data centers in the depicted embodiment. In one embodiment, several different fields or attributes of the data records may comprise location-related information—for example, one field may indicate a location from which the data was obtained for inclusion in the data set, another field may indicate a location constraint with respect to storing the record, another field may indicate a location constraint with respect to access or analysis requests, and so on. In some embodiments, a DSAS may proactively add one or more location-related fields (such as a field indicating the location from which the data was obtained) to data records at the time of ingestion or insertion of the records, e.g., in preparation for potential location-related regulations that may be passed in the future, as well as to comply with current regulations. In one example scenario in which data records pertaining to entities in several different states of a country is stored at the DSAS, the DSAS may automatically add a field indicating the state in which the data record was generated, even if none of the states of the country may have passed state-specific location constraint regulations. Adding the state information (or information at other granularities such as county or city granularity) proactively may make it easier for the DSAS to comply with state-level regulations which may be introduced in the future. In some embodiments, a data creation location determiner (DCLD) within the DSAS may populate such fields, e.g., as part of the process of ingesting or adding data to the DSAS at run time. The DCLD may determine location information, at a selected granularity, pertaining to the creation of a data record, and include the location information within a field of the data record.

An example data set 305 may comprise three partitions in the scenario shown in FIG. 3. Partition P1 may comprise data records generated in a country C1 with no regulatory constraints on storage location or computation. Partition P3 may comprise data records generated in a country C3 where regulatory constraints also do not apply. However, partition P2 may comprise data records generated in a country C2 where regulatory constraints RC1 apply to both storage and computation—e.g., the regulations may require data generated in C3 to be stored within C3, and computed on within C3.

A primary copy 320 of partition P1 may be stored in region R1 data center 310A in country C1 in the depicted example scenario, e.g., close to where the records of that partition were created. A primary copy 321 of partition P2 may be stored in region R2 data center 310B in country C2 in the depicted example scenario, and a primary copy 322 of partition P3 may be stored in region R3 data center 310C in country C3. The regions in which the primary copies of various partitions are stored may be referred to as home regions 350 of the partitions.

In order to enable computations which require data of multiple partitions to be analyzed to be performed efficiently, one or more of the partitions may be replicated from their home regions to other regions in the depicted scenario, as long as the replication complies with applicable location-related regulatory constraints. For example, respective replicas 325 and 327 of P1 may be created and stored within region R2 data center 310B and region R3 data center 310C, as there are no regulatory constraints on where P1 data records can be stored. Similarly, replicas 324 and 326 of P3 may be created and stored within region R1 data center 310A and region R2 data center 310B, as there are no regulatory constraints on where P3 data records can be stored. However, due to regulatory constraints RC1, records of P2 may not be stored outside C2 in the example scenario of FIG. 3. When executing a multi-partition computation on data set 305, all three partitions' contents may thus be available in region R2 data center 310B, but only two partitions' contents may be available within the other data centers. The regions within which replicas of the primary copy of a given partition are stored may be referred to as secondary regions 352 in the depicted embodiment. Metadata stored at the DSAS may indicate, corresponding to each partition of a data set, the home region for that partition, as well as the secondary regions (if any) at which copies of the partition are stored. Clients of the DSAS on whose behalf data sets are stored may specify policies to be used to handle situations in which some portions of their data sets cannot be accessed in a given location at which a multi-partition computation may be desired, as described in further detail below.

Figure 4:
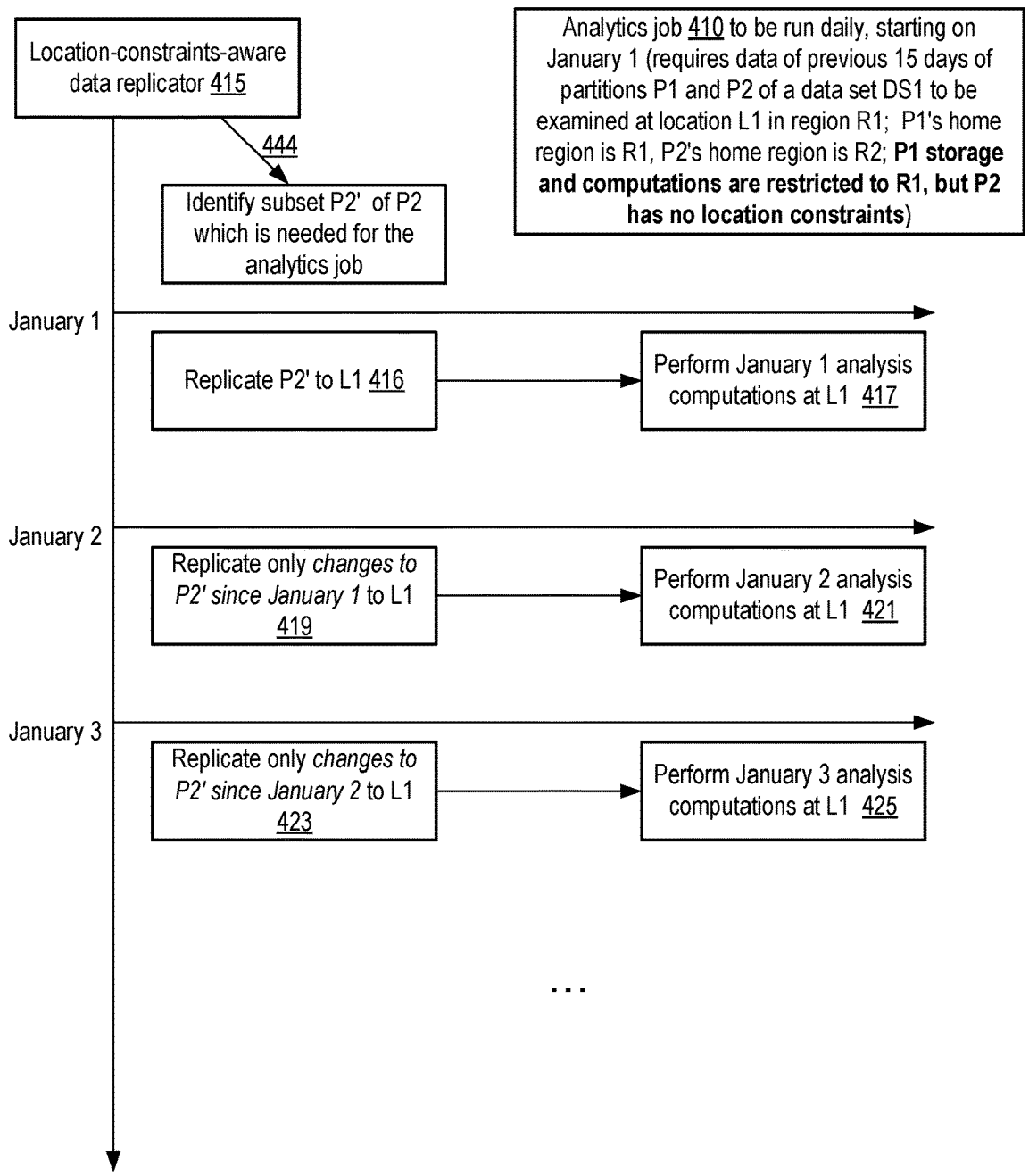
FIG. 4 illustrates an example incremental replication technique which may be implemented to support location constraints, according to at least some embodiments.

FIG. 4 illustrates an example incremental replication technique which may be implemented to support location constraints, according to at least some embodiments. In the example scenario depicted in FIG. 4, an analytics job 410 which is to be run daily starting on January 1 of a particular year may be received at a DSAS. The analytics job may require at least some of the data collected over the previous 15 days in partitions P1 and P2 of a data set DS1 to be examined at a location L1 in a geographical region R1. P1's home region is assumed to be R1 (i.e., the primary copy of P1 may be stored at a premise within R1), while P2's home region is assumed to be a different region R2. Location constraints on storage and/or computation may apply to P1, restricting P1 to R1, but no such constraints may apply to P2.

A location-constraints-aware data replicator 415 implemented at one or more computing devices of the DSAS may be employed in the depicted embodiment to help with the execution of analytics job 410. The data replicator may optimize replication of data in two ways: first, it may identify the subset P2' of P2 which is needed for the analytics job 410, as indicated by arrow 444. For example, if the data set is assumed to comprise a table comprising a plurality of data records, which each data record including values of a plurality of columns, it may be the case that the analytics job only requires a subset of the columns, and only the needed columns may be included in P2'.

Second, the replicator 415 may schedule daily copying to L1 of the minimum data that is needed to execute the job in the example scenario shown in FIG. 4. For the initial (January 1) execution of analytics job 410, the entirety of P2' may be replicated to L1 (as indicated in block 416), as this is the first execution of the job. The January 1 analysis computations of the job may be performed using this version of P2' (as well as the locally available contents of P1), as indicated in block 417. For subsequent daily executions of the job, however, only the changes to P2' since the previous day may be transferred to L1 by the replicator. For example, on January 2, only the changes made to P2' since January 1 may be transferred, as indicated in block 419, and the January 2 analysis computations may be performed using this additional data at L1, as indicated in block 421. Similarly, on January 3, only the changes made to P2' since January 2 may be transferred, as indicated in block 423, and the January 3 analysis computations may be performed using this additional data at L1, as indicated in block 425. This type of replication may be referred to as incremental replication. The replicator may thus minimize the network bandwidth and other resources needed to execute the requested analytics job, while ensuring that location constraints of the targeted data set are complied with in the depicted embodiment.

Figure 5:
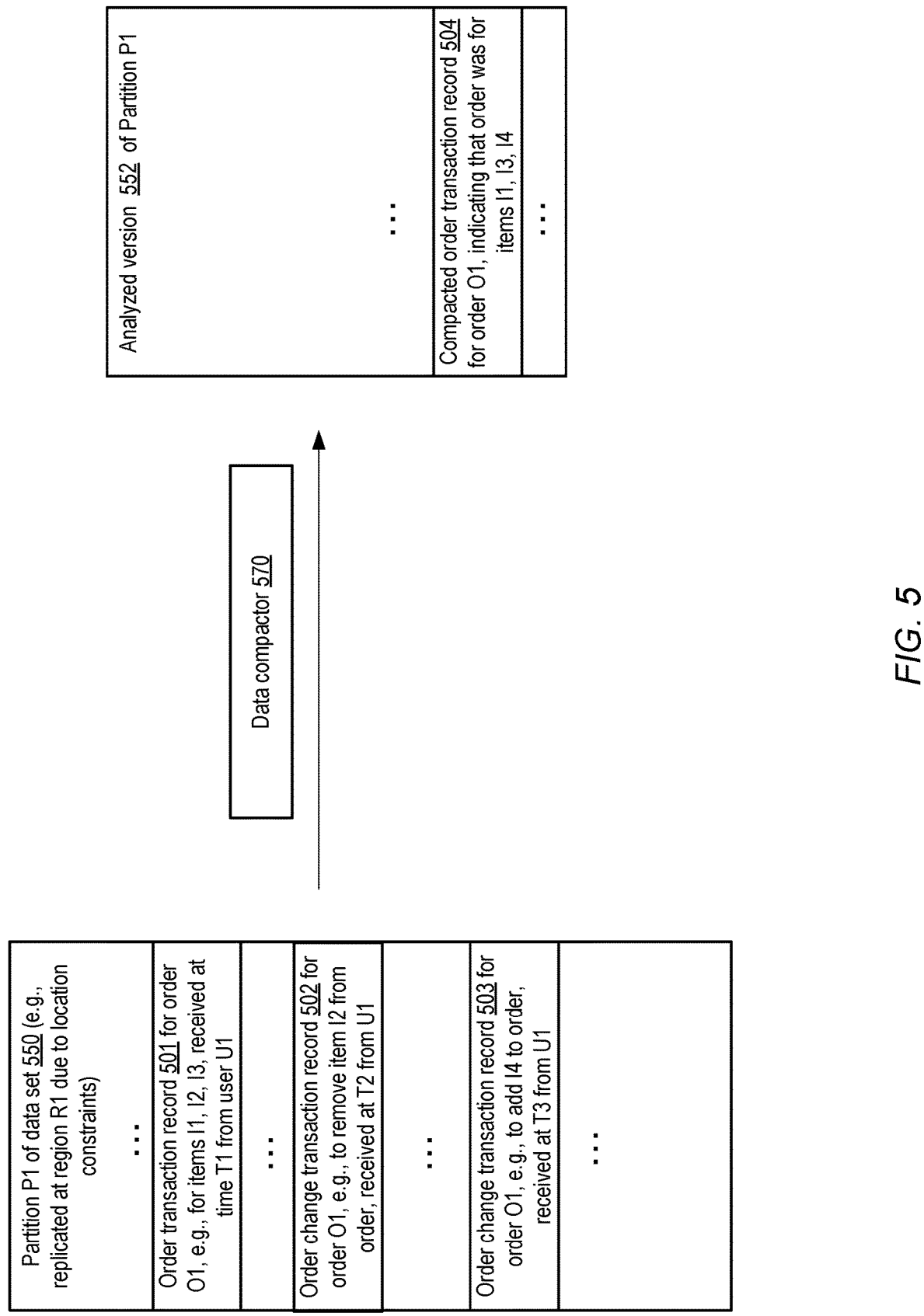
FIG. 5 illustrates an example logical data compaction technique which may be implemented at a data storage and analytics service, according to at least some embodiments.

FIG. 5 illustrates an example logical data compaction technique which may be implemented at a data storage and analytics service, according to at least some embodiments. For certain types of applications whose data is managed using a DSAS, multiple data records may contain information about the same underlying entity or event (e.g., an order for products sold at a web site), such that the totality of information about the entity or event can be obtained and used for efficient analysis after combining the information in the multiple data records.

In the example scenario shown in FIG. 5, records of a partition P1 of a data set 550 may comprise information about orders for items sold at a retail web site. Order transaction record 501 may be the first record pertaining to an order O1 received from a particular end user U1 of the retail web site. Order transaction record 501 may be stored at time T1, indicating that U1 has ordered three items I1, I2 and I3 from the web site as part of order O1. At some subsequent time T2, U1 may decide to remove item I2 from O1, and an order change transaction record 502 may be added to partition P1 indicating that I2 has been removed. At a subsequent time T3, U1 may decide to once again change order O1, this time by adding item I4 to the order, and an order transaction record 503 may be added to partition P1. Note that each of these three records may be logically linked to one another, e.g., via a unique order identifier assigned to O1.

In order to make analysis computations pertaining to partition P1 more efficient, a data compactor 570 implemented at one or more computing devices may be utilized by the DSAS in the depicted embodiment. In the analyzed version 552 of partition P1, which may be generated for example at a secondary region to which a portion of P1 was replicated using replication techniques of the kind introduced above, a single compacted order transaction record 504 may be created and used to replace the three records 501, 502 and 503. In the compacted order transaction record for the order, only the final set of items I1, I3 and I4 are indicated. Including fewer records in the analyzed version may help to accelerate the analysis, compared for example to scenarios in which all the records pertaining to the order were retained. Note that while the kind of logical compaction indicated in FIG. 5 results in a reduction in the amount of space used for a partition, logical compaction differs from compression techniques (in which a respective compressed version may be generated for every record of a data set) because the total number of records may be reduced using logical compaction. Note also that logical compaction may not be used for certain types of analysis—e.g., if the analysis was directed to the number and/or types of changes in the orders placed at a web site, logical compaction which eliminates the details of the changes may not be appropriate.

Figure 6:
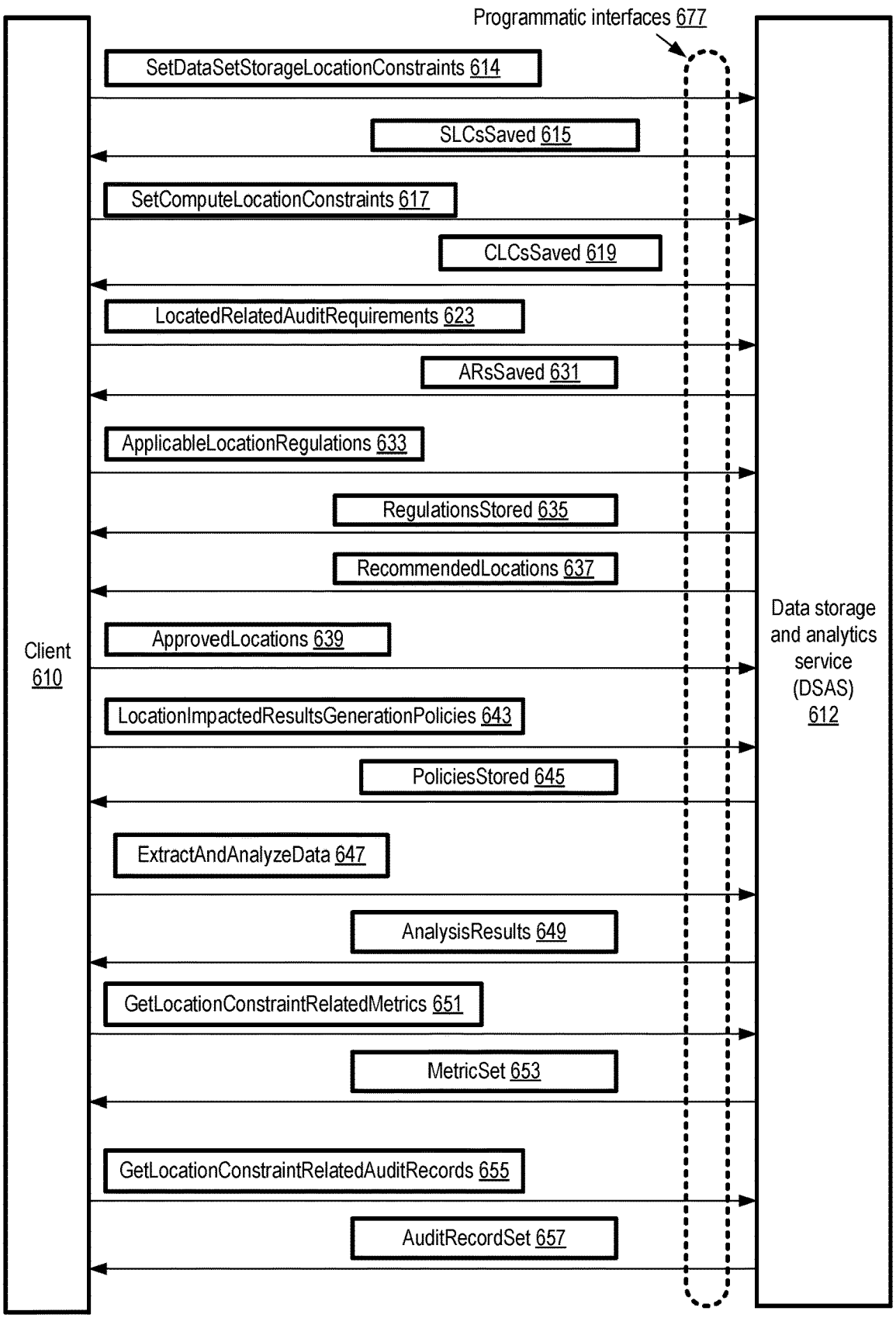
FIG. 6 illustrates example programmatic interactions, associated with location constraints, between clients and a data storage and analytics service, according to at least some embodiments.

FIG. 6 illustrates example programmatic interactions, associated with location constraints, between clients and a data storage and analytics service, according to at least some embodiments. A data storage and analytics service 612, similar in functionality to DSAS 120 of FIG. 1, may implement a set of programmatic interfaces 677 in the depicted embodiment, which may be used to clients 610 (such as data set owners/producers and/or data consumers) to submit messages/requests pertaining to location constrained storage and analysis of large data sets and to receive corresponding responses. The programmatic interfaces 677 may include, among others, web-based consoles, command-line tools, graphical user interfaces, APIs and the like in different embodiments.

Using the programmatic interfaces 677, a client 610 may submit a SetDataSetStorageLocationConstraints message 614 to the DSAS 612, indicating constraints on the locations at which one or more portions of a data set can be stored, e.g., on persistent storage devices such as rotating disks or disk arrays, solid state drives (SSDs) and the like. The constraints may be derived from regulations in the relevant jurisdictions in which the data is generated or to which the data pertains in some embodiments. The storage location constraints may be saved in a metadata repository of the DSAS and an SLCsSaved message 615 confirming that the constraints have been saved may be sent to the client. Similarly, a SetComputeLocationConstraints message 617 may be used by a client to specify constraints on the locations at which servers or other computing devices that are used to analyze portions or all of a data set stored at the DSAS, and a CLCsSaved message 619 may be sent to a client after the computation related location constraint information is stored in the metadata repository. Note that in some cases, a single message may be used to specify location constraints for storage as well as computations for a given collection of data, in which case separate messages for storage and computation constraints may not be required. Note that in some embodiments, a client may specify a set of properties of a data set (such as the kind of transactions or entities represented in the data set) via the programmatic interfaces 677, without explicitly specifying the location constraints, and the DSAS may analyze the specified properties to identify the constraints on storage and/or computation that apply to the data set.

In various embodiments, clients of the DSAS may wish to obtain audit records pertaining to the locations at which various portions of data sets are stored, as well as the locations where analysis of the data is performed, the locations from which analysis requests are received from data consumers, and the like. A LocationRelatedAuditRequirements message 623 may be submitted via the programmatic interfaces 677 to the DSAS in the depicted embodiment, specifying the kinds of audit records which the client wishes to have the DSAS generate for one or more data sets. The audit requirements may include required retention periods for audited information, indicating how long the audit records have to be retained by the DSAS on behalf of the client. The audit requirements may be stored in the metadata maintained at the DSAS for the data sets, and an ARsSaved message 631 may be sent to the client in at least some embodiments.

In some cases, the DSAS may have access to resources for storage and/or computing at a large number of premises of a cloud computing environment, including large regional data centers as well as numerous provider network extension sites of the kind discussed in the context of FIG. 1. Clients of the DSAS may have broad information about the regulations governing locations at which data can be stored and analyzed, but may not necessarily have detailed knowledge regarding all the premises available to the DSAS. In some embodiments, a client may simply specify the regulations, and rely on the DSAS to provide recommendations as to the specific premises at which data governed by the regulations should be stored and/or analyzed. An ApplicableLocationRegulations message 633 may be sent to the DSAS by a client 610 in such an embodiment, indicating the regulations pertaining to one or more data sets of the client, but not providing an indication of particular premises at which the data should be stored or analyzed. The regulations may be saved at the DSAS and a RegulationsStored message 635 may be sent to the client in some embodiments. If the client opted in to receive recommendations, one or more RecommendedLocations messages 637 may be sent to the client from the DSAS suggesting various regions, data centers and/or extension sites at which the client's data set can be stored to comply with the regulations. If the client approves of the recommendations, the client may in turn send an ApprovedLocations message 639, and the recommended premises may be used for the client's data and computations in the depicted embodiment.

In one embodiment, a client (such as a data set owner, or a consumer of the data set on whose behalf analysis is to be conducted) may submit one or more LocationImpactedResultsGenerationPolicies messages 643 to the DSAS, indicating the manner in which the DSAS should handle scenarios in which some portions of a data set may not be available for analysis computations due to the location constraints. A number of different policies may be selected by the client for different types of analysis requests and for different data sets, as discussed below in further detail with respect to FIG. 8. The policies may be stored in the metadata maintained for the data sets, and a PoliciesStored message 645 may be sent to the client to indicate that the policies were received and will be applied for subsequent analytics requests.

A client may load data sets from one or more data sources into the DSAS, such as relational or non-relational database systems, object storage services and the like in various embodiments using programmatic data load requests not shown in FIG. 6. An ExtractAndAnalyzeData request 647 may be submitted to initiate computations of various kinds, including computations that are to be scheduled periodically as new data becomes available. In some embodiments, the ExtractAndAnalyzeData requests may indicate location constraints indicating where the computations can or cannot be performed. The requested computations may be performed in accordance with applicable location constraints by the DSAS in the depicted embodiment, and one or more AnalysisResults messages 649 may be sent to the client with the results obtained in the computations.

A number of metrics may be collected at the DSAS pertaining to location constraint enforcement in some embodiments. Such metrics may include, for example, measures of how much data was stored in and/or replicated to various locations to comply with location constraints, the number of analysis requests whose results were impacted by location constraints, the number of different premises at which data of a given data set was stored or analyzed, and so on. A client may submit a GetLocationConstraintRelatedMetrics request 651 to view such metrics, and the metrics may be provided via one or more MetricSet messages 653 in the depicted embodiment.

Figure 7:
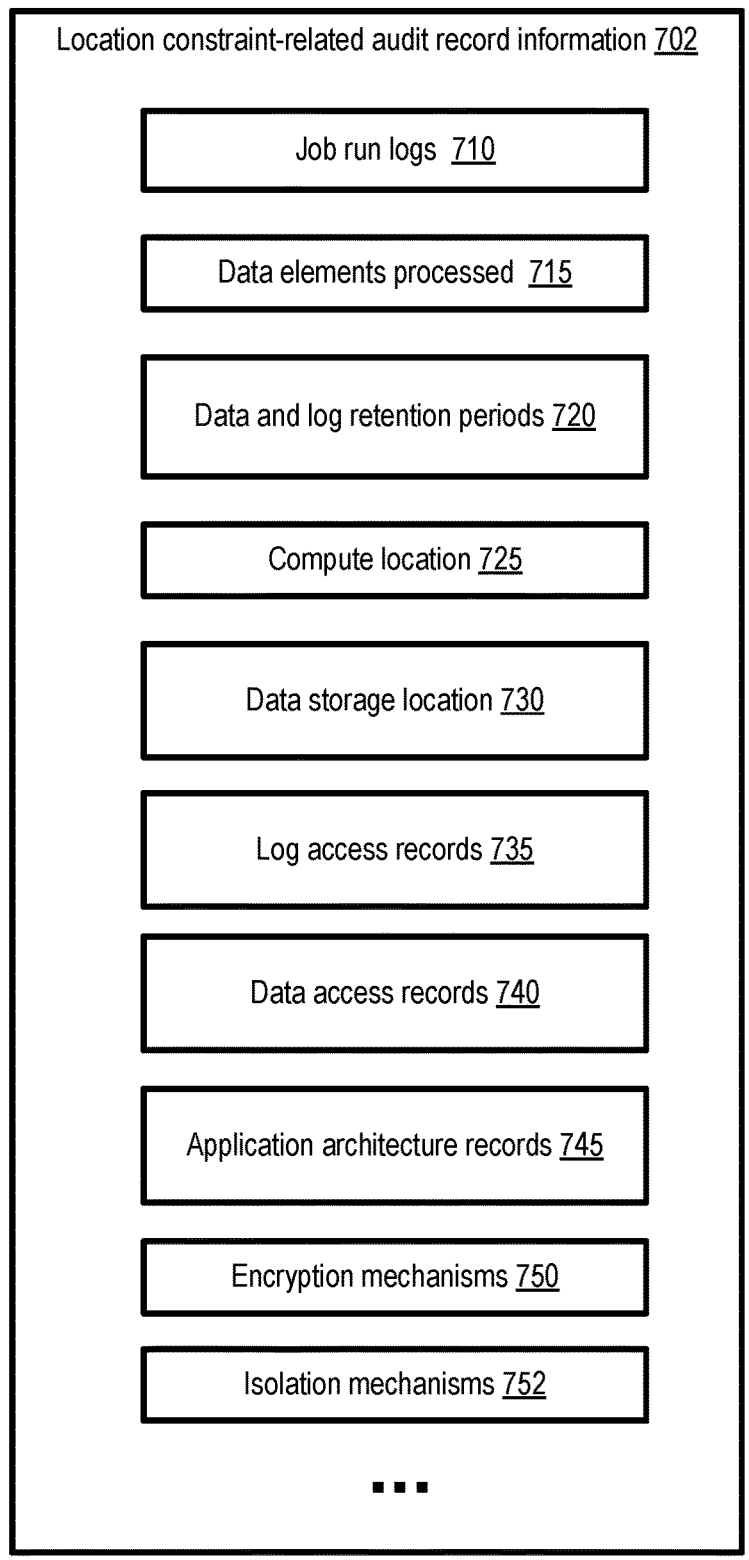
FIG. 7 illustrates example categories of location constraint-related audit information which may be provided by a data storage and analytics service, according to at least some embodiments.

Various types of audit records pertaining to location constraints enforcement may be generated at a DSAS in some embodiments, containing categories of audit record information such as those discussed below in the context of FIG. 7. A client may request some or all of the audit records pertaining to the client's data sets via one or more GetLocationConstraintRelatedAuditRecords requests 655. The DSAS may send one or more AuditRecordSet messages 657 to the client comprising the requested audit records in the depicted embodiment. The audit records may for example be provided by the client to government authorities in various jurisdictions as evidence that the applicable regulations were followed. In some embodiments, programmatic interactions other than those shown in FIG. 6 pertaining to location constraints on the storage and analysis of data sets may be supported by a DSAS.

In various embodiments, a DSAS may provide audit records containing information related to storage and processing of data with associated location constraints; such records may for example be useful as evidence of compliance with regulations pertaining to location constraints. FIG. 7 illustrates example categories of location constraint-related audit information which may be provided by a data storage and analytics service, according to at least some embodiments. Location constraint-related audit record information 702 in some embodiments may include job run logs 710 indicating, for example, the times at which analysis job requests were submitted, when the corresponding jobs were started and ended, and so on. The data elements processed 715 in a given analytics job may be indicated in audit records in some embodiments.

Information about data and log retention periods 720 (e.g., how long certain types of data are stored before being deleted, and how long log records associated with the data, including audit records, are retained) may be saved and provided to clients of the DSAS in some embodiments. The compute location 725 may indicate the physical location(s) (e.g., at the city or state level where applicable) at which an analysis job was performed. The data storage location 730 may indicate the physical location(s) at which various data sets are stored.

Log access records 735 may comprise information about when, by whom, and/or from where (e.g., as indicated by approximate physical locations and/or by Internet Protocol addresses of the access requests) log records of operations managed using the DSAS were accessed in some embodiments. Data access records 740 may similarly comprise information about when, by whom, and/or from where the data sets themselves were accessed.

In some embodiments, application architecture records 745 may be saved and provided by a DSAS as part of the audit information, indication for example the logical layers (e.g., web servers, compute clusters, databases, physical storage devices etc.) of the storage and analysis applications implemented with respect to various data sets. Encryption mechanisms 750 utilized to protect the data may be indicated in audit records in some embodiments. Similarly, isolation mechanisms 752, such as the use of isolated virtual networks (also known as virtual private clouds or VPCs), and/or physical isolation techniques (e.g., storing data is data center rooms with extra physical security) may be described in audit information provided by a DSAS. Note that in at least some embodiments, various combinations of the kinds of information indicated in FIG. 7 may be included in a single audit record—i.e., not all the information categories may be represented within individual audit records. In some embodiments, depending for example on the regulations in the jurisdictions involved, some of the kinds of information indicated in FIG. 7 may be included in audit records.

As mentioned earlier, in some cases the results of an analysis request may be affected by the location constraints applicable to a portion of the targeted data which is to be analyzed—e.g., because of the location constraints, some of the targeted data may not be accessible in the way it would have been accessible in the absence of the location constraints. FIG. 8 illustrates example policies which may be implemented at a data storage and analytics service to handle analysis requests whose results may be impacted by location constraints, according to at least some embodiments. Location-impacted response generation policies 802 for analysis job requests in the depicted embodiment may include a UseAggregatedVersionOfInaccessibleData 815. For some types of data, the location constraints may apply to the raw or original form of the data, while aggregated values obtained by applying statistical or mathematical functions to the raw data may not have location constraints, as the aggregated values would typically not reveal details of individual records included in the raw data. For numeric values stored in a particular column of the data records of a particular partition of a data set, for example, a location constraint may apply to the raw values, but such constraints may not necessarily apply in all cases to mean, median or mode values derived from the raw data. According to the UseAggregatedVersionOfInaccessibleData policy, the DSAS may be permitted to use aggregated values instead of raw data values for certain types of analysis operations/requests in the depicted embodiment. The types of analyses operations for which aggregate values should be used, and or the types of aggregation algorithms or statistics that can be employed, may also be specified along with the policy itself in some embodiments.

In some embodiments and for some types of analyses, the data set owner or data consumer may wish to substitute specific values instead of the true values of data which cannot be accessed due to location constraints. To support such requirements, a UseSubstitutedVersionOfInaccessibleData policy 820 may be specified by the data set owner or consumer for one or more types of analysis operations. For example, numeric values in the portion of the data which cannot be accessed due to location constraints may be replaced by zero, string values may be replaced by an empty string " ", and so on.

For some kinds of analysis jobs, it may be possible to split a given job into smaller jobs called sub-jobs, run the sub-jobs at premises where the location constraints are not violated, and then combine the results of the different sub-jobs without violating location constraints. For such analysis operations, a policy referred to as SplitJobIntoSubJobsAndCombineResults 825 may be specified. In some embodiments, the DSAS may automatically split at least some types of jobs and combine results when possible, even if a client has not explicitly specified that this type of approach should be used.

Some data owners or consumers may wish to enforce a policy whereby if a portion of a data set that would otherwise be analyzed in response to a job request cannot be analyzed in its raw form, an error message indicating that the job could not be conducted due to location constraints be provided. A FailAndProvideLocationRelatedErrorMessage 830 policy may be applied to elicit such behavior from the DSAS in some embodiments. In some embodiments, a policy that simply results in an error message for an analysis job (without an explanation that the job failed due to location constraints) if a portion of a targeted data set cannot be accessed due to location constraints may be employed for certain types of analysis tasks.

Some clients may specify that a policy referred to as IgnoreAccessibleData 835 be employed for one or more types of analysis tasks. According to this policy, the computations of the analysis may only be performed on the portion of the targeted data set which is accessible, and the portion (if any) which cannot be accessed due to location constraints may simply be ignored. In effect, the DSAS may make a best effort to respond to the analysis request using the data which can be accessed, without taking any actions such as substituting or aggregating the inaccessible raw data. Other policies than the policies shown in FIG. 8 for handling analysis tasks in scenarios in which portions of the targeted data set cannot be accessed due to location constraints may be utilized in some embodiments. Note that in many cases, replicating portions of the data may enable all the targeted data to be analyzed without violating location constraints; some of the policies shown in FIG. 8 may only be required in scenarios in which such replication is insufficient to enable all the targeted data to be analyzed, or in scenarios in which the logic of the analysis operation is such that division of the job into smaller sub-jobs is not feasible or practical.

Figure 9:
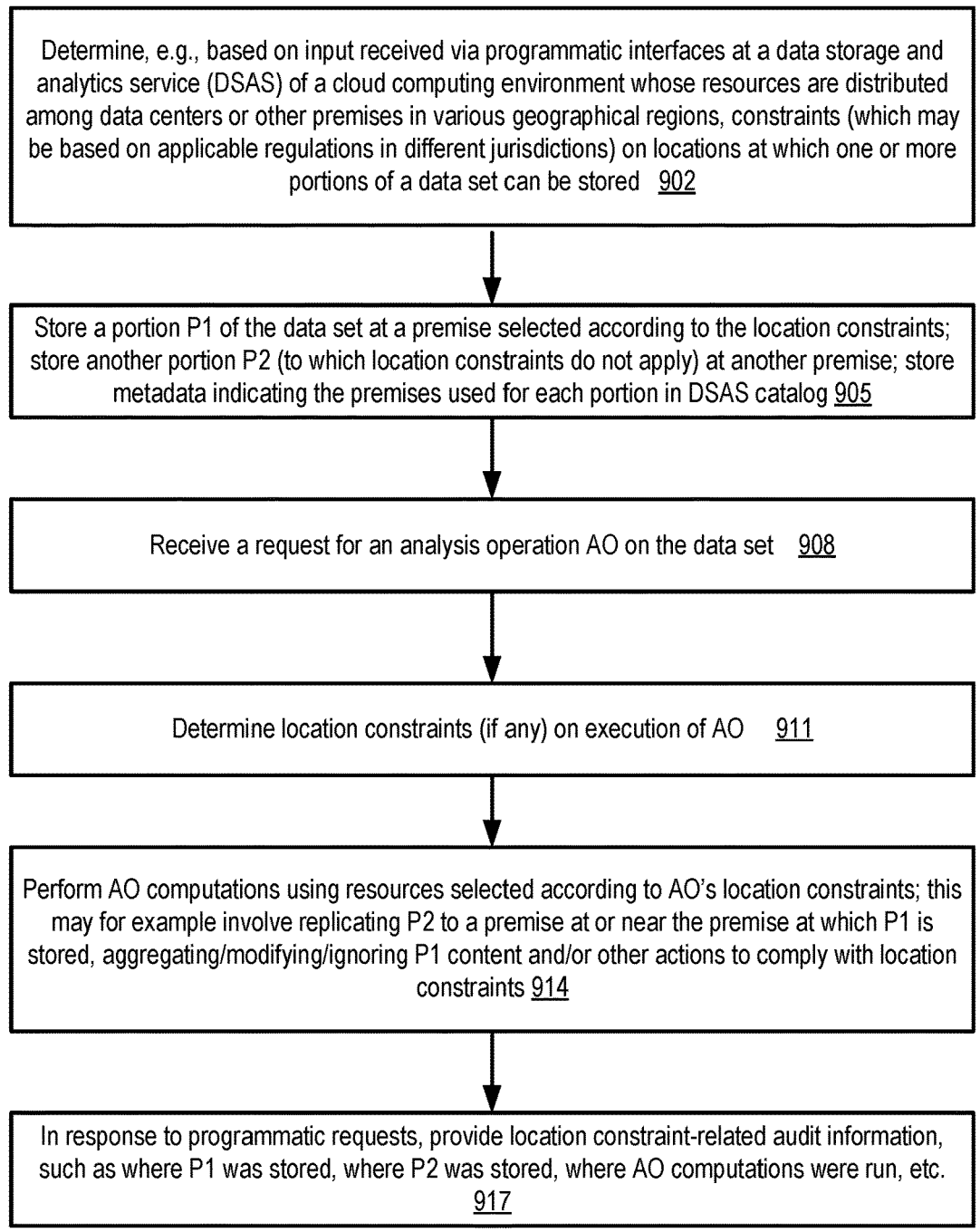
FIG. 9 is a flow diagram illustrating aspects of operations that may be performed to support location constraints for data storage and computations, according to at least some embodiments.

FIG. 9 is a flow diagram illustrating aspects of operations that may be performed to support location constraints for data storage and computations, according to at least some embodiments. As shown in element 902, a set of constraints on locations at which one or more portions of a data set can be stored may be determined, e.g., at a data storage and analytics service (DSAS) of a cloud computing environment. The constraints may be obtained via input received using programmatic interfaces of the DSAS in some embodiments, and may have been derived from regulations governing data security and privacy in various jurisdictions around the world. The cloud computing environment may have storage and computing resources distributed among numerous premises (such as large regional data centers as well as smaller extension premises) spread across numerous cities, states and countries in some cases, making the cloud computing environment a suitable choice for enforcing the location constraints.

A portion P1 of the data set may be stored at a premise selected in accordance with the location constraints on storage (element 905). Other portions of the data set, including a second portion P2, to which similar location constraints may not apply, may be stored at other premises selected based on factors such as availability of free space on persistent storage devices, proximity to the source of the data, and so on in various embodiments.

A request for an analysis operation AO on the data set may be received (element 908), e.g., via the programmatic interfaces of the DSAS in various embodiments. Location constraints (if any apply) on where AO can be performed or executed (element 911). In some embodiments, the request for AO may specify the location constraints with regard to AO computations. In other embodiments, the same location constraints which apply to the data set targeted by AO may apply to the computations of AO—that is, if the data targeted by AO can only be stored in a particular region R, then it may be assumed that it is the case that AO computations can also only be performed in R.

AO's computations may be performed using resources selected in accordance with the applicable location constraints in various embodiments (element 914). In some cases, in order to perform AO's computations, some portions of the targeted data set such as P2 may have to be replicated at or near a premise at which other portions of the targeted data set (such as P1) are stored. In other cases, approaches such as aggregating, modifying or ignoring some of the location-constrained portions of the data set such as P1 may be taken, e.g., based on policies selected by the data set owner/producer or the data consumer at whose request AO is being performed. In some embodiments, resources (such as powerful clusters of computing servers optimized for the requested type of analysis) already available or provisioned at the selected premise for AO may be used for AO. In other embodiments, resources may have to be dynamically provisioned or configured on demand at the selected premises to perform AO computations. In various embodiments, specific resources chosen to perform AO may be selected from a larger plurality of resources based at least in part on the location of the specific resources.

In response to one or more programmatic requests, the DSAS may provide location constraint-related audit information, such as where (e.g., which city, state or country) P1 was stored, where P2 was stored or replicated, where AO computations were run, and the like in the depicted embodiment (element 917). It is noted that in various embodiments, some of the operations shown in the flow diagram of FIG. 9 may be implemented in a different order than that shown in the figure, or may be performed in parallel rather than sequentially. Additionally, some of the operations shown in FIG. 9 may not be required in one or more implementations.

In various embodiments, as mentioned earlier, a data storage and analytics service that can support location constraints on data storage and computations may be implemented as part of a cloud provider network or cloud computing environment. FIG. illustrates an example provider network, according to at least some embodiments. In the depicted embodiment, provider network 1001 may comprise resources used to implement a plurality of services, including for example a virtualized computing service (VCS) 1003, a database/storage service 1023, and a data storage and analytics service (DSAS) 1070. The DSAS 1070, similar in features and functionality to DSAS 120 of FIG. 1, may comprise several lower-level services in the depicted embodiment, such as a data lake management service 1030, an orchestration service 1040 and a high-end computations service 1050 in the depicted embodiment. The data lake management service may be responsible for storage of data sets, e.g., with specific persistent storage devices being selected for different portions of the data sets by a collection of storage managers 1034. Metadata 1032, comprising for example a catalog which includes various annotations indicating location constraints, may be maintained for the different data sets within the data lake management service.

The high-end computations service may include compute cluster managers 1052, responsible for provisioning or selecting compute servers for large scale computation tasks on the data sets maintained by the data lake management service in the depicted embodiment, establishing network connectivity between the servers of a given cluster, and so on. The clusters may be employed to execute big data analysis and machine learning algorithms 1057 on behalf of data consumer clients of the DSAS in the depicted embodiment. Analysis requests directed at the data sets may be submitted in the form of jobs, and one or more job schedulers 1042 of the orchestration service may be responsible for deciding the order in which pending jobs should be run while keeping location constraints in view. Data schedulers 1044 may be responsible for verifying that the targeted data sets for various analysis tasks are made available in a timely manner (e.g., using some of the techniques discussed earlier such as efficient replication, logical compaction and the like) for the jobs in the depicted embodiment.

Components of a given service of a provider network may utilize components of other services in the depicted embodiment—e.g., for some tasks such as computations of the kind discussed above, virtual machines or compute instances implemented at computing servers such as 1005A-1005D of the virtualized computing service 1003 may be used by the high-end computations service, data sets may be stored at storage servers 1025 (e.g., 1025A-1025D) of database/storage service 1023, and so on.

Figure 10:
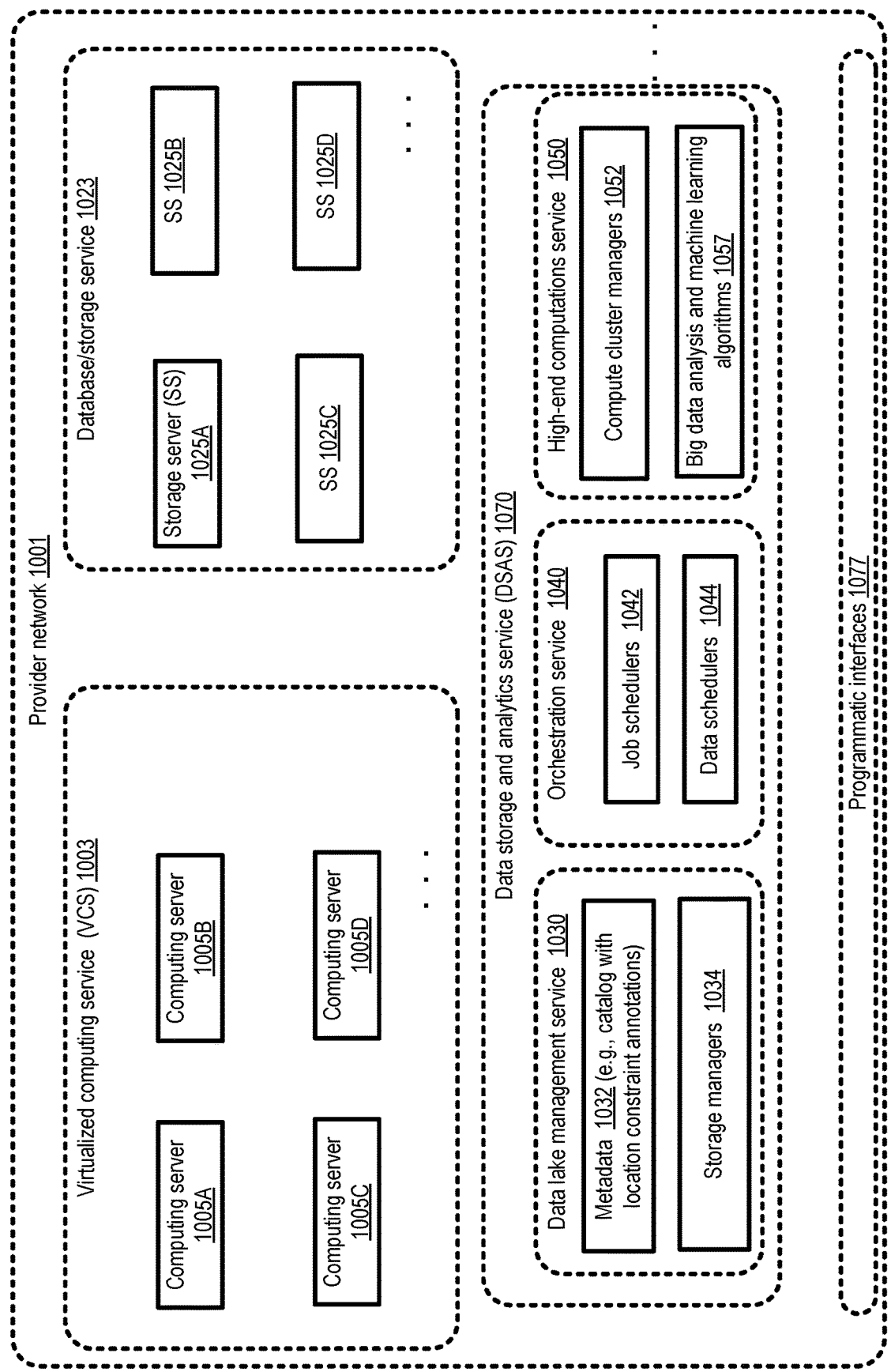
FIG. 10 illustrates an example provider network, according to at least some embodiments.

Individual ones of the services shown in FIG. 10 may implement a respective set of programmatic interfaces 1077 which can be used by external and/or internal clients (where the internal clients may comprise components of other services) in the depicted embodiment. In at least some embodiments, resources of a cloud provider network may not be required for supporting location-constrained storage and analysis of large data sets; instead, for example, a standalone set of tools may be used.

As discussed earlier, a provider network 1001 can, in general, be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, a DSAS may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as provider network extension sites (PNESs) or local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

A virtualized computing service (VCS) 1003 of the cloud provider network may offer virtual compute instances (also referred to as virtual machines, or simply "instances") with varying computational and/or memory resources in various embodiments. In one embodiment, each of the virtual compute instances may correspond to one of several instance types or families, and instances of any of several families may be employed for computations on data sets of a DSAS. An instance type may be characterized by its hardware type, computational resources (e.g., number, type, and configuration of central processing units [CPUs] or CPU cores, hardware accelerators for various tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. Various types of compute instances, some of which may have access to hardware accelerators (e.g., incorporated within cards connected via Peripheral Component Interconnect-Express (PCIe) links to the primary processors of virtualization servers at which the compute instances are run) may be used for analysis of large data sets of the DSAS in different embodiments.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Machine learning models and other tools used for analysis of DSAS data sets may be run using containers in at least some embodiments.

The traffic and operations of the cloud provider network, and individual services such as the DSAS, may broadly be subdivided into two categories in various embodiments: control plane operations and data plane operations. While the data plane represents the movement of data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 11:
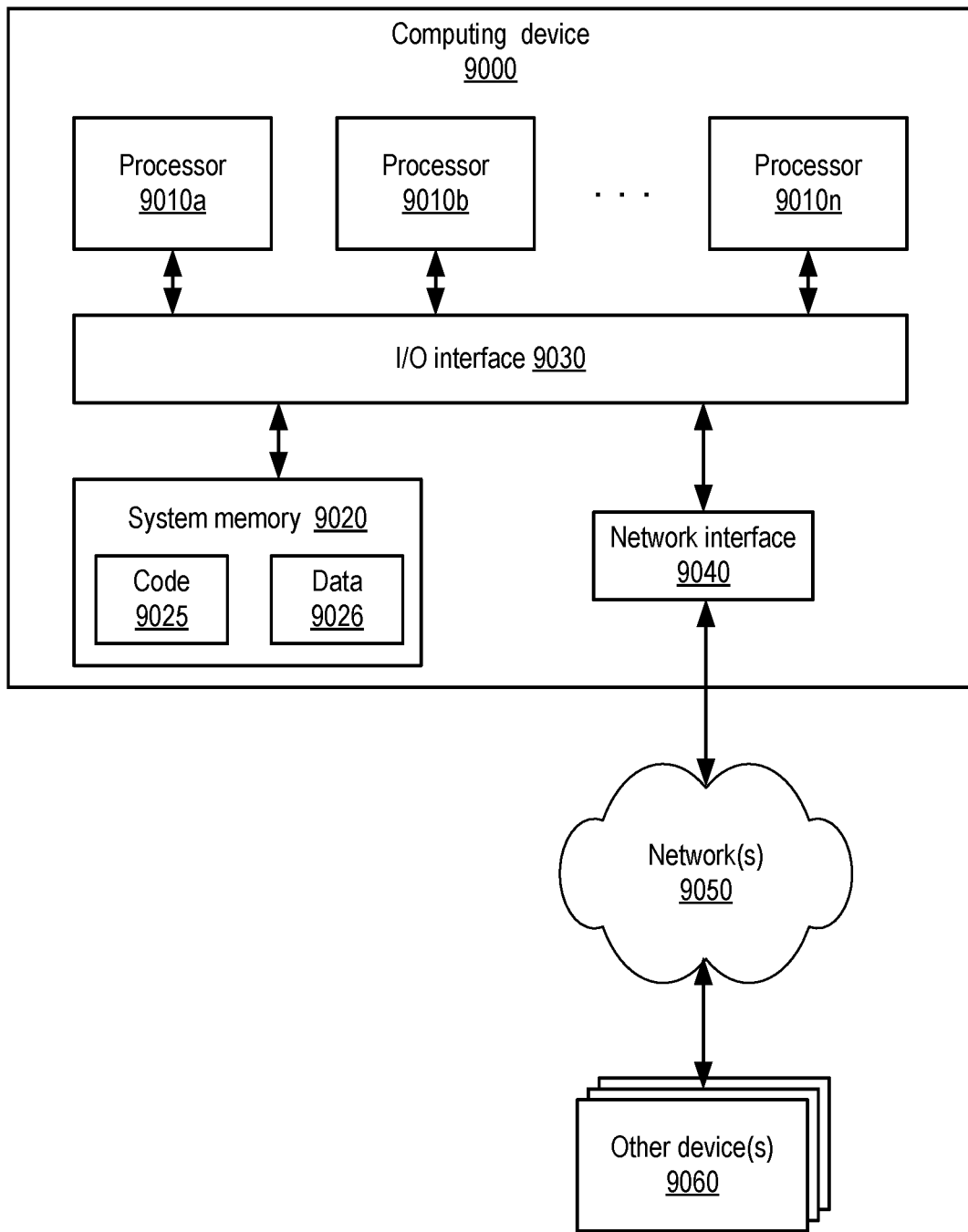
FIG. 11 is a block diagram illustrating an example computing device that may be used in at least some embodiments.

In at least some embodiments, a server that implements the types of techniques described herein (e.g., various functions of a DSAS, and/or other services of a provider network), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices:
determine, based at least in part on input received via one or more programmatic interfaces of a cloud computing environment whose resources are distributed among a plurality of data centers in respective geographical regions, a first constraint on a location at which a first portion of a data set can be stored, wherein the first constraint is compliant with a first legal requirement applicable to the first portion of the data set, and wherein the data set is to be used as input for one or more analysis operations performed using computing resources of the cloud computing environment;
store the first portion of the data set at a first set of persistent storage resources selected in accordance with the first constraint, wherein the first set of persistent storage resources is located at a first data center of the plurality of data centers;
store location metadata pertaining to a plurality of portions of the data set at the cloud computing environment, wherein the location metadata indicates that
a second portion of the data set is stored at a second set of persistent storage devices at a second data center of the plurality of data centers, wherein the first legal requirement is not applicable to the second portion of the data set;
determine a second constraint on a location at which computations of a particular analysis operation of the one or more analysis operations can be performed;
perform the computations of the particular analysis operation at the first data center in accordance with the second constraint, wherein to perform the computations of the particular analysis operation comprises to:
obtain a replica of the second portion of the data set from the second data center to the first data center; and
use at least the first portion and the replica of the second portion of the data set as input, at a set of computing resources of the cloud computing environment at the first data center, wherein the set of computing resources is selected in accordance with the second constraint; and provide, via the one or more programmatic interfaces, one or more audit records indicating (a) a location at which the first portion of the data set was stored and (b) a location at which the computations of the particular analysis operation were performed.

2. The system as recited in claim 1, wherein the set of computing resources is located in the first data center, and wherein the one or more computing devices include further instructions that upon execution on or across the one or more computing devices:

cause, prior to initiation of the computations of the particular analysis operation, the replica of the second portion of the first data set to be obtained in the first data center.

3. The system as recited in claim 1, wherein the one or more computing devices include further instructions that upon execution on or across the one or more computing devices:

obtain an indication of a second legal requirement pertaining to data generated in a particular geographical region of the respective geographical regions; and provide, via the one or more programmatic interfaces to an owner of a second data set, a recommended location for storing a portion of the second data set in accordance with the second legal requirement.

4. The system as recited in claim 1, wherein the one or more computing devices include further instructions that upon execution on or across the one or more computing devices:

provide, via the one or more programmatic interfaces, one or more metrics associated with compliance with one or more location constraints including the first constraint.

5. The system as recited in claim 1, wherein the one or more computing devices include further instructions that upon execution on or across the one or more computing devices:

obtain, via the one or more programmatic interfaces, a set of audit requirements associated with at least the first data set, wherein the one or more audit records are generated in accordance with the set of audit requirements.

6. A computer-implemented method, comprising:

determining, based at least in part on input received via one or more programmatic interfaces, a first constraint on a location at which a first portion of a data set can be stored in compliance with one or more regulations, wherein the data set is to be consumed as input by one or more analysis operations;

storing the first portion of the data set at a first location selected in accordance with the first constraint;

wherein a second portion of the data set is stored at a second location which differs from the first location, wherein the one or more regulations are not applicable to the second portion of the data set; and performing, at a set of computing resources, a particular analysis operation of the one or more analysis operations, at the first location in accordance with the first constraint, wherein performing the particular analysis operation comprises obtaining a replica of the second portion of the data set from the second location to the first location, wherein at least the first portion of the data set and the replica of the second portion of the data set are consumed as input by the particular analysis operation at the first location, and wherein the set of computing resources is selected in accordance with the one or more regulations.

7. The computer-implemented method as recited in claim 6, further comprising:

provide, via the one or more programmatic interfaces, a set of audit records indicating one or more of (a) the first location at which the first portion of the data set was stored or (b) a location at which the particular analysis operation was performed.

8. The computer-implemented method as recited in claim 6, further comprising:

receiving the input via the one or more programmatic interfaces from a producer of at least the first portion of the data set.

9. The computer-implemented method as recited in claim 6, further comprising:

receiving additional input via the one or more programmatic interfaces from a data consumer, wherein the additional input includes (a) a request to perform the particular analysis operation and (b) an indication of a second constraint on a location at which the particular analysis operation can be performed, wherein the second constraint complies with the one or more regulations, and wherein the set of computing resources is selected in accordance with the second constraint.

10. The computer-implemented method as recited in claim 6, wherein the set of computing resources is located at a particular location, the computer-implemented method further comprising:

storing the second portion of the data set at the second location which differs from the first location, wherein the one or more regulations are not applicable to the second portion of the data set; and replicating, prior to performing the particular analysis operation, the second portion of the data set to the first location, wherein input of the particular analysis operation includes the second portion of the data set.

11. The computer-implemented method as recited in claim 10, wherein the replicating comprises:

transmitting a modification record indicating a change to the second portion of the data set, wherein the change occurred after an earlier version of the second portion was replicated to the first location.

12. The computer-implemented method as recited in claim 10, further comprising:

implementing, at the first location prior to performing the particular analysis operation, a logical compaction operation on the second portion of the data set which was replicated to the first location, wherein the logical compaction operation comprises replacing, by a single record, a plurality of related records.

13. The computer-implemented method as recited in claim 6, further comprising:

determining, in response to a request for another analytics operation directed to the data set, that in compliance with a set of location constraints including the first constraint, at least the second portion of data set cannot be used as input for the other analytics operation; and preparing a response to the request for the other analytics operation in accordance with a location-impacted response generation policy.

14. The computer-implemented method as recited in claim 13, wherein preparing the response to the request for the other analytics operation in accordance with the location-impacted response generation policy comprises aggregating one or more values in the second portion of the data set.

15. The computer-implemented method as recited in claim 13, further comprising:
obtaining, via the one or more programmatic interfaces, an indication of the location-impacted response generation policy from a submitter of the request for the other analytics operation.

16. One or more non-transitory computer-accessible storage media storing program instructions that when executed on or across one or more processors:
determine, based at least in part on input received via one or more programmatic interfaces, a first constraint on a location at which a first portion of a data set can be stored, wherein the data set is to be consumed as input by one or more analysis operations;
store the first portion of the data set at a first location selected in accordance with the first constraint;
wherein a second portion of the data set is stored at a second location which differs from the first location, wherein the first constraint does not apply to the second portion of the data; and
perform, at a set of computing resources, a particular analysis operation of the one or more analysis operations, at the first location in accordance with the first constraint, wherein performing the particular analysis operation comprises obtaining a replica of the second portion of the data set from the second location to the first location, wherein at least the first portion of the data set and the replica of the second portion of the data set are consumed as input by the particular analysis operation at the first location, and wherein the set of computing resources is selected in accordance with the one or more regulations.

17. The one or more non-transitory computer-accessible storage media as recited in claim 16, storing further program instructions that when executed on or across the one or more processors:
provide, via the one or more programmatic interfaces, a set of audit records indicating one or more of (a) the first location at which the first portion of the data set was stored or (b) a location at which the particular analysis operation was performed.

18. The one or more non-transitory computer-accessible storage media as recited in claim 16, storing further program instructions that when executed on or across the one or more processors:
receive the input via the one or more programmatic interfaces from a producer of at least the first portion of the data set.

19. The one or more non-transitory computer-accessible storage media as recited in claim 16, wherein the data set comprises a plurality of data records, wherein individual ones of the data records comprise one or more fields, the one or more non-transitory computer-accessible storage media storing further program instructions that when executed on or across the one or more processors:
determine location information, at a selected granularity, pertaining to the creation of a particular data record of the data set; and
cause the location information to be included in a field of the particular data record.

20. The one or more non-transitory computer-accessible storage media as recited in claim 16, storing further program instructions that when executed on or across the one or more processors:
store the second portion of the data set at the second location which differs from the first location; and
replicate, prior to performing the particular analysis operation, the second portion of the data set to the first location, wherein input of the particular analysis operation includes the second portion of the data set.

\* \* \* \* \*